United States Patent
Nastasi et al.

(10) Patent No.: US 11,927,227 B2
(45) Date of Patent: Mar. 12, 2024

(54) SEALING DEVICE FOR WHEEL HUB ASSEMBLY

(71) Applicant: Aktiebolaget SKF, Gothenburg (SE)

(72) Inventors: Antonia Nastasi, Turin (IT); Mickael Sansalone, Utrecht (NL)

(73) Assignee: AKTIEBOLAGET SKF (SE)

( * ) Notice: Subject to any disclaimer, the term of this patent is extended or adjusted under 35 U.S.C. 154(b) by 848 days.

(21) Appl. No.: 17/006,953

(22) Filed: Aug. 31, 2020

(65) Prior Publication Data

US 2021/0071763 A1 Mar. 11, 2021

(30) Foreign Application Priority Data

Sep. 5, 2019 (IT) .................. 102019000015647

(51) Int. Cl.
*F16D 3/84* (2006.01)
*F16J 15/3264* (2016.01)

(52) U.S. Cl.
CPC .......... *F16D 3/843* (2013.01); *F16J 15/3264* (2013.01); *F16C 2326/02* (2013.01)

(58) Field of Classification Search
CPC ............ B60B 27/0073; F16C 11/0642; F16C 33/723; F16C 33/784; F16C 33/7859; F16C 33/7869; F16C 33/7873; F16C 33/7879; F16C 2326/02; F16D 3/84; F16D 3/843; F16J 15/3264
USPC ......................................................... 464/178
See application file for complete search history.

(56) References Cited

U.S. PATENT DOCUMENTS

| | | | | |
|---|---|---|---|---|
| 2,438,794 A | * | 3/1948 | Waring .................. | F16J 15/322 277/553 |
| 2,621,091 A | * | 12/1952 | Hickling ............. | F16C 33/7873 277/411 |
| 3,526,409 A | * | 9/1970 | Heinlein ............... | F16C 33/784 277/411 |
| 4,844,485 A | * | 7/1989 | Antonini ................ | F16J 15/164 277/553 |
| 7,226,360 B2 | * | 6/2007 | Lyon ..................... | F16C 33/723 464/146 |
| 7,287,909 B2 | * | 10/2007 | Sakamoto ........... | B60B 27/0021 384/482 |

(Continued)

FOREIGN PATENT DOCUMENTS

| | | | | |
|---|---|---|---|---|
| DE | 1058318 B | * | 10/2002 | ............ F16C 33/784 |
| DE | 10152585 A1 | * | 10/2002 | .......... F16C 33/7883 |

(Continued)

OTHER PUBLICATIONS

International Search Report for corresponding Italian Patent Application No. 102019000015647 dated May 20, 2020.

*Primary Examiner* — Josh Skroupa
(74) *Attorney, Agent, or Firm* — Reed Smith LLP

(57) ABSTRACT

Sealing device for a wheel hub assembly provided with a rolling bearing, the sealing device being provided with a shield mounted on an outer ring of the bearing and with an annular cylindrical wall having an inner lateral surface mounted on an outer lateral surface of a collar of the outer ring; and with a sealing material fixed to the shield and defined by a pre-formed annular covering of polymer material, preferably but not necessarily rubber or thermoplastic material, formed independently and separately from the shield and mounted on the shield.

14 Claims, 1 Drawing Sheet

(56) References Cited

U.S. PATENT DOCUMENTS

| | | | |
|---|---|---|---|
| 8,628,249 B2 * | 1/2014 | Winkelmann | F16C 33/726 |
| | | | 277/552 |
| 8,925,929 B2 * | 1/2015 | Cermak | F16D 3/84 |
| | | | 464/906 |
| 9,611,897 B2 * | 4/2017 | Edwards | F16D 3/843 |
| 9,845,881 B2 * | 12/2017 | Fujii | F16J 15/3228 |
| 10,294,994 B2 * | 5/2019 | Sato | F16C 33/723 |
| 11,143,241 B2 * | 10/2021 | Wu | F16C 33/723 |
| 11,391,327 B2 * | 7/2022 | Sen | F16D 3/843 |
| 2008/0067759 A1 * | 3/2008 | Ashida | F16J 15/3216 |
| | | | 277/644 |
| 2019/0070898 A1 | 3/2019 | Falossi et al. | |

FOREIGN PATENT DOCUMENTS

| | | | | |
|---|---|---|---|---|
| DE | 102010044427 A1 * | 3/2012 | | F16J 15/3264 |
| DE | 202015106914 U1 * | 2/2016 | | F16J 15/3264 |
| DE | 102015217561 A1 * | 3/2017 | | F16C 33/7879 |
| EP | 0198324 A2 * | 10/1986 | | F16C 33/7859 |
| EP | 2466161 | 6/2012 | | |
| EP | 2685117 | 1/2014 | | |
| FR | 2077051 A5 * | 10/1971 | | F16C 33/7879 |
| FR | 2095829 A5 * | 2/1972 | | F16C 33/784 |
| JP | 2003314573 A * | 11/2003 | | F16C 33/7879 |
| JP | 2012036960 | 2/2012 | | |
| JP | 2014190464 A * | 10/2014 | | F16C 33/723 |

\* cited by examiner

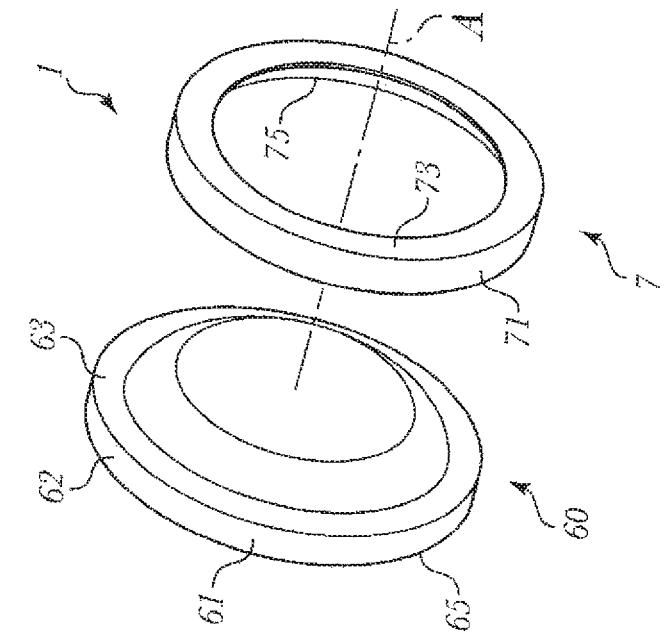
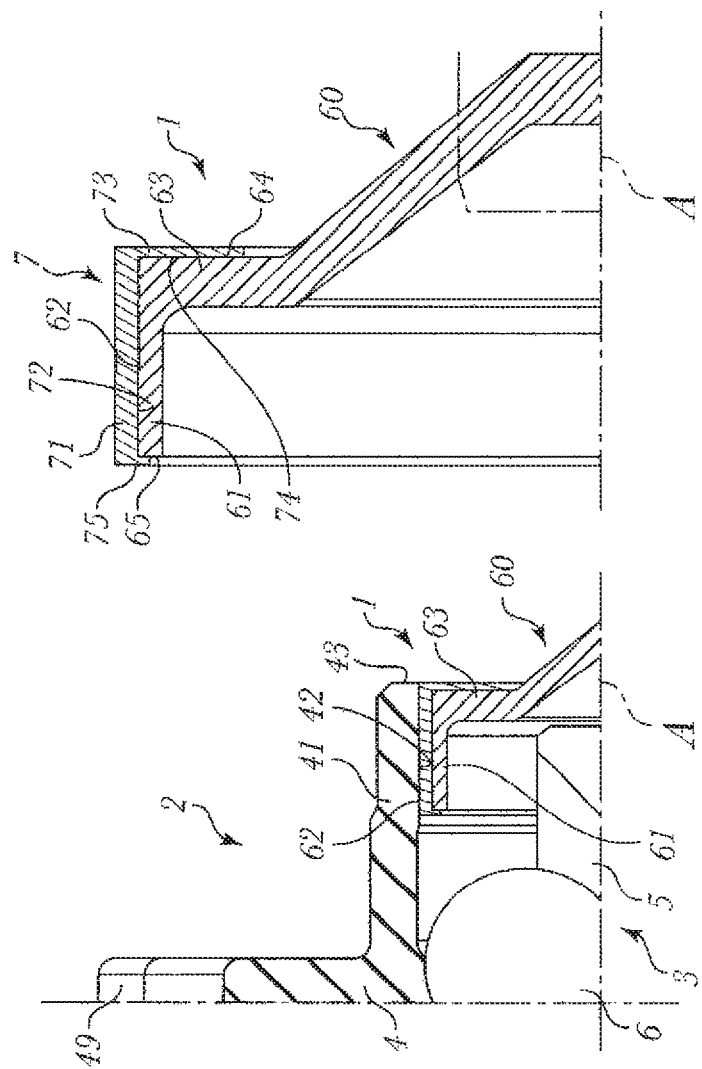

SEALING DEVICE FOR WHEEL HUB ASSEMBLY

CROSS REFERENCE OF RELATED APPLICATIONS

This application is based on and claims priority to Italian Application No. 102019000015647, filed Sep. 5, 2019, under 35 U.S.C. § 119, the entire contents of which are incorporated herein by reference.

FIELD

The present disclosure relates to a sealing device for a wheel hub assembly.

BACKGROUND

Sealing devices of the known type have a "cup"—shaped asymmetric configuration, are made of metallic material, and are force-fitted into the outer ring of the bearing to form a static seal that protects the bearing from any environmental contaminant (water, mud, debris, etc.).

BRIEF DESCRIPTION OF THE DRAWINGS

The invention will now be described with reference to the attached drawings, which show a non-limiting example of its embodiment, in which:

FIG. 1 is a sectional view, with parts removed for clarity, of embodiments of the sealing device for a wheel hub assembly in accordance with this disclosure;

FIG. 2 is a view on an enlarged scale of a detail of a sealing device for a wheel hub assembly in accordance with this disclosure; and FIG. 3 is an exploded view of a sealing device for a wheel hub assembly in accordance with this disclosure.

DETAILED DESCRIPTION

In accordance with this disclosure a sealing device is produced for a wheel hub assembly which is free of the drawbacks in known devices described above.

The present disclosure is directed to aspects of an improved wheel hub assembly. The concepts herein are generally applicable to bearing assemblies. This disclosure describes these concepts in the context of the field of wheel hub assemblies for motor vehicles provided with a rolling bearing for a wheel, wherein the inner ring of the bearing is fixed on to the axle of the wheel, while the outer ring of the bearing is mounted on a fixed upright, for example an upright of a suspension of the motor vehicle. The following description refers by way of example to this specific application, without thereby losing any generality.

In its most generic shape, a sealing device comprises a relatively cup-shaped metal shield fitted into a collar of an outer ring of a rolling bearing by means of interference fitting. Such a shield comprises, in particular, a cylindrical wall whose outer radial surface is coupled by said interference fitting to an inner radial surface of a collar of the outer ring of a bearing. For the purpose of both retaining a metal shield in position and improving a static sealing capacity, a sealing device further comprises a sealing material or compound placed behind an inner axial surface of a metal shield and compressed radially between a shield and a collar when the latter has been fitted; alternatively, a sealing device may comprise, instead of sealing material or compound behind an outer axial surface, a layer of rubber-like material, again located behind an outer axial surface. Such a layer is typically produced by a process of co-moulding rubber-like material on to a metal shield.

Configurations of sealing devices of types described above certainly simplify mounting of a metal shield, but, in some cases, the interference fitting causes a migration of sealing material or compound along an interface between a metal shield and an outer ring. While a co-moulding of a layer of rubber-like material behind an outer axial surface makes the co-moulded material more stable during an interference fitting, this solution has a high production cost, because a metal shield has to be prepared and pre-treated before a co-moulding process. Also, costs to manufacture and maintain moulds are very high.

With reference to FIG. 1, number 1 indicates the whole of a sealing device for a wheel hub assembly 2.

Assembly 2 is provided with a rolling bearing 3 comprising an outer ring 4, coaxial with an axis of rotation A of bearing 3 itself, an inner ring 5 coaxial with outer ring 4, and a plurality of rolling elements 6 interposed between two rings 4 and 5 to allow rotation of inner ring 5 relative to outer ring 4. In the exemplary embodiments of an assembly 2 described here, inner ring 5 is rotatable to support a vehicle wheel (not illustrated), while outer ring 4 is stationary and is mounted in a cylindrical seat (not illustrated) of an upright of a vehicle (not illustrated). On completion of this mounting, outer ring 4 of bearing 3 is a flanged ring comprising a flange 49 transverse to axis A, and has a collar 41 which extends axially from flange 49 and is delimited by an inner radial surface 42 and by a frontal annular surface 43. Collar 41 is a portion of the outer ring 4 into which a sealing device 1 is fitted, and is the portion of the outer ring 4 that is inserted into the aforesaid upright.

In some embodiments, a sealing device 1 comprises a shield 60 which is mounted on the outer ring 4 of the bearing 3. Shield 60 is substantially cup-shaped. Shield 60 comprises a cylindrical wall 61. Cylindrical wall 61 has an axial development defining circumferential outer lateral surface 62 extending in an axial direction away from a circular annular wall. Cylindrical wall 61 further defines an annular frontal edge 65 transverse to the outer lateral surface 62. Circular annular wall 63 comprises a substantially radial development, which is fixed to the annular cylindrical wall 61 on an opposite end from frontal edge 65. Circular annular wall 63 forms a bottom of the shield 60, and is provided with an outer axial surface 64.

The sealing device 1 further comprises a pre-formed annular covering 7 of polymer material, preferably but not necessarily made of rubber or thermoplastic material, positioned behind the shield 60, outside the shield 60 itself, in order to hold the metal shield 60 in position in the outer ring 4 of the bearing 3 and to ensure the static sealing capacity of the sealing device 1.

The covering 7 acts as a sealing material in the sealing device 1 within the collar 41 of the outer ring 4, into which the metal shield 60 is fitted, and is formed independently and separately from the shield 60 itself, on to which it is assembled subsequently.

In some embodiments a cover 7 comprises a cylindrical wall 71 having an axial development defining an inner lateral surface 72 coupled to an outer lateral surface 62 of cylindrical wall 61. Cover 7 may also include a circular annular wall 73 having a substantially radial development defining a frontal edge, which is fixed to annular cylindrical wall 71 and is provided with an inner axial surface 74 coupled to an outer axial surface 64 of annular wall 63.

Accordingly, circular annular wall 73 bears on circular annular wall 63. A further circular annular wall 75 having a substantially radial development is fixed to and extends from cylindrical wall 71 on an opposite end from circular annular wall 73, and is coupled to the annular frontal edge 65 of the cylindrical wall 61. Circular annular wall 75 has a radial development of smaller dimensions than a radial development of annular wall 73, has a radially inner diameter D1 of smaller dimensions than a radial diameter D2 of outer lateral surface 62, and substantially defines an annular engagement catch to enable covering 7 to be assembled and permanently fastened to the shield 60.

In embodiments, cover 7 is formed of polymer material. In some exemplary embodiments, cover 7 is formed of rubber. In other embodiments cover 7 is formed of thermoplastic material.

During mounting of covering 7, using the elasticity of the material of covering 7, annular wall 75 is engaged on cylindrical wall 61, causing an elastic deformation of cylindrical wall 71, and is pushed so as to slide axially over outer lateral surface 62 of cylindrical wall 61 until annular wall 75 is disengaged from cylindrical wall 61 engages with annular frontal edge 65, thus completing assembly of covering 7 on to shield 60.

Alternatively, using the elasticity of the material of cover 7, cover 7 is fitted around shield 60 by elastically deforming cylindrical wall 71 in both radial and axial directions, and initially bringing annular wall 73 into contact with annular wall 63 and then bringing annular wall 75 beyond annular frontal edge 65. When annular wall 75 is released behind annular frontal edge 65, assembly of the cover 7 onto shield 60 is complete.

In both cases, use of the innovative preformed covering 7 made of polymer material, preferably but not necessarily rubber or thermoplastic material, provides great advantages by not only enabling covering 7 to be easily and permanently fastened to shield 60, but it also enables covering 7 to be made completely fixed to shield 60. This being further aided by an interference and coupling between the lateral surfaces 62 and 72.

It is evident from the above description that shield 60 requires no surface pre-treatment to be assembled with covering 7. This provides a considerable advantage in terms of production time and costs.

In accordance with this disclosure, a sealing device for a wheel hub assembly provided with a rolling bearing has the characteristics stated in the appended independent claim. Optimization of the components of a sealing device in accordance with this disclosure not only confers the advantage of fitting the metal shield into a bearing without needing to take excessive precautions and also considerably reduces production costs without degrading static sealing characteristics associated with previously known co-moulded sealing devices.

In addition to the embodiments described above, upon reading this disclosure it will be understood that numerous other variants exist. Upon reading this disclosure it will also be understood that said embodiments are provided solely by way of example and do not limit the object of the invention or its applications or its possible configurations. On the contrary, although the description given above enables those skilled in the art to implement the present invention according to at least one example of its configurations, upon reading this disclosure it will be understood that numerous variations of the components described may be envisaged without thereby departing from the object of the invention as defined in the appended claims, interpreted literally and/or according to their legal equivalents.

The invention claimed is:

1. A sealing device comprising:
   a shield configured to be mounted on an outer ring of a bearing, the shield comprising an annular cylindrical wall comprising an outer lateral surface configured for mounting on an inner lateral surface of a collar of an outer ring of the bearing, the shield further comprising a circular annular wall extending radially inwardly from a first end of the annular cylindrical wall, the circular annular wall comprising an axially outer surface, and
   an annular covering fixed to the shield and formed of a sealing material that is formed independently and separately from the shield and mounted on the shield, the annular covering comprising:
      a cylindrical wall comprising an axially inner surface coupled by interference to the outer lateral surface of the annular cylindrical wall of the shield; and,
      a first circular annular wall extending radially inwardly from a first end of the cylindrical wall of the annular covering, the first circular annular wall comprising an axially inner surface configured to mount to the axially outer surface of the circular annular wall of the shield.

2. The sealing device of claim 1, wherein the annular covering is not formed by co-moulding.

3. The sealing device of claim 1, wherein the annular covering is formed of rubber or thermoplastic material.

4. The sealing device of claim 3, wherein the annular covering comprises an annular engagement catch.

5. The sealing device of claim 1, wherein the annular covering comprises an annular engagement catch.

6. The sealing device of claim 5, wherein the annular engagement catch is configured to allow the annular covering to be assembled by plastically deforming a portion of the annular covering and further configured to allow the annular covering to be fastened permanently on to the shield.

7. The sealing device of claim 5, wherein the annular engagement catch comprises a second circular annular wall comprising a substantially radial development, which is coupled to the cylindrical wall at an opposite end from the first circular annular wall, and is coupled to an annular frontal edge of the cylindrical wall.

8. A wheel hub assembly comprising the sealing device of claim 7.

9. A wheel hub assembly comprising the sealing device of claim 1.

10. A sealing device, comprising:
    a shield configured to be mounted on an outer ring of a bearing, the shield comprising an annular cylindrical wall comprising an outer lateral surface configured for mounting on an inner lateral surface of a collar of an outer ring of the bearing, the shield further comprising a circular annular wall extending radially inwardly from a first end of the annular cylindrical wall, the circular annular wall comprising an axially outer surface, and
    an annular covering fixed to the shield and formed of a sealing material that is formed independently and separately from the shield and mounted on the shield, wherein an annular engagement catch is configured to allow the annular covering to be assembled by plastically deforming a portion of the annular covering and further configured to allow the annular covering to be fastened permanently on to the shield, further wherein the annular covering comprises:
- a cylindrical wall comprising an axial inner surface coupled by interference to the outer lateral surface of the annular cylindrical wall of the shield; and,
- a first circular annular wall extending radially inward from a first end of the cylindrical wall of the annular covering, the first circular annular wall comprising an axially inner surface configured to mount to the axially outer surface of the circular annular wall of the shield, wherein the annular engagement catch comprises a second circular annular wall comprising a substantially radial development, which is coupled to the cylindrical wall at an opposite end from the first circular annular wall, and is coupled to an annular frontal edge of the cylindrical wall.

11. The sealing device of claim 10, wherein the annular covering is not formed by co-moulding.

12. The sealing device of claim 10, wherein the annular covering is formed of rubber or thermoplastic material.

13. A wheel hub assembly comprising the sealing device of claim 12.

14. A wheel hub assembly comprising the sealing device of claim 10.

* * * * *